(12) United States Patent
Chae et al.

(10) Patent No.: US 11,465,351 B2
(45) Date of Patent: Oct. 11, 2022

(54) CONFIGURABLE BUILD VOLUME SYSTEMS

(71) Applicant: GM GLOBAL TECHNOLOGY OPERATIONS LLC, Detroit, MI (US)

(72) Inventors: HyungMin Chae, Troy, MI (US); Mark A. Smith, Huntington Woods, MI (US); Richard J. Skurkis, Lake Orion, MI (US); Whitney A. Poling, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 16/733,759

(22) Filed: Jan. 3, 2020

(65) Prior Publication Data

US 2021/0206072 A1   Jul. 8, 2021

(51) Int. Cl.
| | |
|---|---|
| *B29C 64/245* | (2017.01) |
| *B33Y 50/02* | (2015.01) |
| *B29C 64/25* | (2017.01) |
| *B29C 64/153* | (2017.01) |
| *B33Y 30/00* | (2015.01) |
| *B33Y 10/00* | (2015.01) |
| *B29C 64/393* | (2017.01) |

(52) U.S. Cl.
CPC .......... *B29C 64/245* (2017.08); *B29C 64/153* (2017.08); *B29C 64/25* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/245; B29C 64/153; B29C 64/393; B29C 64/25; B33Y 10/00; B33Y 30/00; B33Y 50/02
See application file for complete search history.

(56) References Cited

U.S. PATENT DOCUMENTS

2010/0090374 A1* 4/2010 Dietrich ................. B22F 10/20
264/497
2019/0032429 A1* 1/2019 Parton ................... E21B 19/155

* cited by examiner

*Primary Examiner* — Joseph S Del Sole
*Assistant Examiner* — John Robitaille
(74) *Attorney, Agent, or Firm* — Quinn IP Law

(57) ABSTRACT

A configurable build volume system for a powder bed fusion manufacturing process includes a chamber wall defining a chamber, the chamber wall extending in the X-, Y-, and Z-axis directions, a plurality of build platforms enclosed within the chamber, a plurality of adjustment mechanisms coupled to the plurality of build platforms such that each build platform is coupled to a separate adjustment mechanism, a sensor mounted within the chamber and configured to capture data regarding a Z-axis position of each of the plurality of build platforms, and a controller in electronic communication with the plurality of adjustment mechanisms and the sensor. The controller receives the Z-axis position data and generates a plurality of control signals to adjust a Z-axis position of each of the plurality of build platforms and each of the plurality of build platforms is actively and independently controlled by the controller.

18 Claims, 7 Drawing Sheets

Recoater direction

Recoater direction

CONFIGURABLE BUILD VOLUME SYSTEMS

INTRODUCTION

The present disclosure relates generally to a configurable and adjustable build volume system including multiple build platforms and wall configurations for high throughput powder bed additive manufacturing.

Powder bed fusion is an additive manufacturing technology which creates a 3D part one layer at a time using a fine powder as the print medium. This powder is sintered or melted with either a laser or an electron beam as the heat source.

Inside of a sealed chamber in a 3D printer, powder is spread on the surface of a build plate. A laser or electron beam will selectively melt or sinter the first layer of powder while also anchoring it to the build plate. Then the platform is lowered by the depth of one layer. Additional powder is recoated over the surface with a blade or wiper, and the process repeated for the next layer. However, when multiple parts having different heights or volumes are processed, various amounts of the powder are wasted, such as when several shorter or smaller parts are processed in the same build volume as a larger or taller part. Additionally, spreading the powder over the single platform surface as each layer is applied increases the manufacturing time.

SUMMARY

Embodiments according to the present disclosure provide a number of advantages. For example, embodiments according to the present disclosure enable improved throughput with less waste and minimal thermal distortion for powder bed additive manufacturing processes.

In one aspect of the present disclosure, a configurable build volume system for a powder bed fusion manufacturing process includes a chamber wall defining a chamber, the chamber wall extending in the X-, Y-, and Z-axis directions, a first build platform including a first platform surface, the first build platform enclosed within the chamber, a second build platform including a second platform surface, the second build platform enclosed within the chamber, a first adjustment mechanism including a first rotatable post coupled to the first build platform at a first end and coupled to a first motor at a second end opposite the first end, the first adjustment mechanism enclosed within the chamber, a second adjustment mechanism including a second rotatable post coupled to the second build platform at a first end and coupled to a second motor at a second end opposite the first end, the second adjustment mechanism enclosed within the chamber, a sensor mounted within the chamber and configured to capture position data regarding a first position along the Z-axis of the first build platform and a second position along the Z-axis of the second build platform, and a controller in electronic communication with the first and second adjustment mechanisms and the sensor. The controller receives the position data from the sensor, generates a first control signal to adjust a Z-axis position of the first build platform to a first position, generates a second control signal to adjust a Z-axis position of the second build platform to a second position within the chamber, transmits the first control signal to the first adjustment mechanism, and transmits the second control signal to the second adjustment mechanism such that the first and second build platforms are independently controlled and adjusted by the controller.

In some aspects, the first build platform includes a first wall separating the first adjustment mechanism from the second adjustment mechanism, and the first wall translates within the chamber with the first build platform.

In some aspects, the second build platform includes a second wall separating the first adjustment mechanism from the second adjustment mechanism, and the second wall translates within the chamber with the second build platform.

In some aspects, the configurable build volume system further includes a separating portion separating the first build platform from the second build platform such that each of the first and second build platforms are physically separated and individually temperature controlled.

In some aspects, the configurable build volume system further includes a third build platform including a third platform surface and a third adjustment mechanism including a third rotatable post coupled to the third build platform at a first end and coupled to a third motor at a second end opposite the first end, the first, second, and third build platforms extending across the chamber in the Y-direction and extending along the X-axis of the chamber such that the second build platform is adjacent to each of the first and third build platforms.

In some aspects, the controller generates a third control signal to adjust a Z-axis position of the third build platform to a third position and transmits the third control signal to the third adjustment mechanism.

In some aspects, each of the first, second, and third build platforms is individually adjustable such that the first build platform is adjustable to a first position along the Z-axis, the second build platform is adjustable to a second position along the Z-axis different from the first position, and the third build platform is adjustable to a third position along the Z-axis different from the first and second positions.

In some aspects, each of the first, second, and third build platforms is individually adjustable such that the first build platform is adjustable to a first position along the Z-axis, the second build platform is adjustable to a second position along the Z-axis, and the third build platform is adjustable to a third position along the Z-axis.

In some aspects, each of the first and second platforms is hexagonal.

In some aspects, the sensor is a three-dimensional (3D) camera.

In another aspect of the present disclosure, a configurable build volume system for a powder bed fusion manufacturing process includes a chamber wall defining a chamber, the chamber wall extending in the X-, Y-, and Z-axis directions, a plurality of build platforms enclosed within the chamber, a plurality of adjustment mechanisms coupled to the plurality of build platforms such that each build platform is coupled to a separate adjustment mechanism, each adjustment mechanism of the plurality of adjustment mechanisms including a rotatable post coupled to the build platform at a first end and coupled to a motor at a second end opposite the first end, a sensor mounted within the chamber and configured to capture data regarding a Z-axis position of each of the plurality of build platforms, and a controller in electronic communication with the plurality of adjustment mechanisms and the sensor. The controller receives the Z-axis position data and generates a plurality of control signals to adjust a Z-axis position of each of the plurality of build platforms and each of the plurality of build platforms is actively and independently controlled by the controller.

In some aspects, the configurable build volume system further includes a separating portion separating each of the plurality of build platforms from each other such that each of the plurality of build platforms is a physically separated volume and is individually temperature controlled.

In some aspects, a Z-axis position of each of the plurality of build platforms is individually adjustable.

In some aspects, each of the plurality of build volumes is hexagonal.

In some aspects, the sensor is a 3D camera.

In some aspects, each of the plurality of build platforms includes a wall extending in the Z-axis direction within the chamber such that when adjacent build platforms are positioned at different positions along the Z-axis, the adjustment mechanisms of the adjacent build platforms are separated by the wall.

In another aspect of the present disclosure, a method for powder bed fusion manufacture of a component includes the steps of providing a configurable build volume system including a chamber wall defining a chamber, the chamber wall extending in the X-, Y-, and Z-axis directions, a plurality of build platforms enclosed within the chamber, and a plurality of adjustment mechanisms coupled to the plurality of build platforms such that each build platform is coupled to a separate adjustment mechanism, each adjustment mechanism of the plurality of adjustment mechanisms including a rotatable post coupled to the build platform at a first end and coupled to a motor at a second end opposite the first end and providing a controller in electronic communication with the plurality of adjustment mechanisms. The method further includes determining, by the controller, a first height of each of the plurality of build platforms such that the plurality of build platforms form a first configuration, generating, by the controller, a plurality of control signals to adjust a Z-axis position of each of the plurality of build platforms such that the plurality of build platforms form a second configuration different from the first configuration, applying a powder to the plurality of build platforms, and monitoring, by the controller, a powder usage of a powder material.

In some aspects, each of the plurality of build platforms includes a wall extending in the Z-axis direction within the chamber such that when adjacent build platforms are positioned at different positions along the Z-axis, the adjustment mechanisms of the adjacent build platforms are separated by the wall.

In some aspects, each of the plurality of build platforms is separated from each other by a separating portion such that each of the plurality of build platforms is a physically separated volume and the method further includes generating, by the controller, a plurality of temperature control signals to adjust a temperature of each of the plurality of build platforms.

In some aspects, providing the configurable build volume further includes providing a sensor mounted within the chamber and in electronic communication with the controller, the sensor configured to capture data regarding a Z-axis position of each of the plurality of build platforms, and the method further includes generating, by the sensor, first Z-axis position data of the plurality of build platforms, receiving, by the controller, the first Z-axis position data, determining, by the controller, a first configuration of the plurality of build platforms from the first Z-axis position data, controlling, by the controller, the plurality of adjustment mechanisms to independently move each of the plurality of build platforms to the first configuration, generating, by the sensor, second Z-axis position data of the plurality of build platforms, receiving, by the controller, the second Z-axis position data, determining, by the controller, a second configuration of the plurality of build platforms from the second Z-axis position data, and controlling, by the controller, the plurality of adjustment mechanisms to independently move each of the plurality of build platforms to the second configuration.

BRIEF DESCRIPTION OF THE DRAWINGS

The present disclosure will be described in conjunction with the following figures, wherein like numerals denote like elements.

Figure 1A:
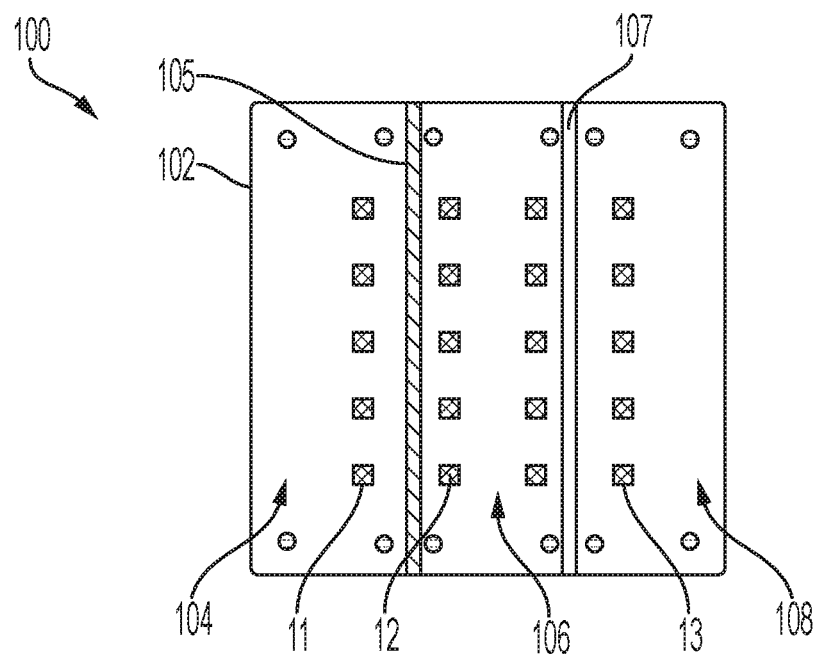
FIG. 1A is a top view of a configurable build volume system for a powder bed additive manufacturing process, according to an embodiment of the disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the disclosure, similar reference numbers refer to similar components.

Current powder bed fusion chambers utilize the full build volume throughout the entire build. When multiple components having different shapes, sizes, and heights are formed in the same build volume, unused powder is generated. This unused powder increases the recycling cost of the powder bed fusion manufacturing process.

Embodiments of the present disclosure include a single chamber for a powder bed fusion machine. The chamber includes multiple build platforms arranged in a one- or two-dimensional array. Each of the platforms may be positioned independently by an adjustment mechanism. In various embodiments, moving walls between build platforms allow for containment and efficient use of powder for a high throughput powder bed fusion process with minimal thermal distortion. In various embodiments, fixed walls between build platforms enable multiple independently moving build platforms. In various embodiments, the build platforms can accommodate different sizes, shapes, etc. depending on the desired component to be manufactured. In various embodiments, the temperature of each build platform is independently controlled to control the thermal gradient during the manufacturing process. In various embodiments, one or more sensors, such as 3D cameras, are used to identify the height or z-axis position of each of the multiple build platforms in order to automatically level the platforms.

Figure 1B:
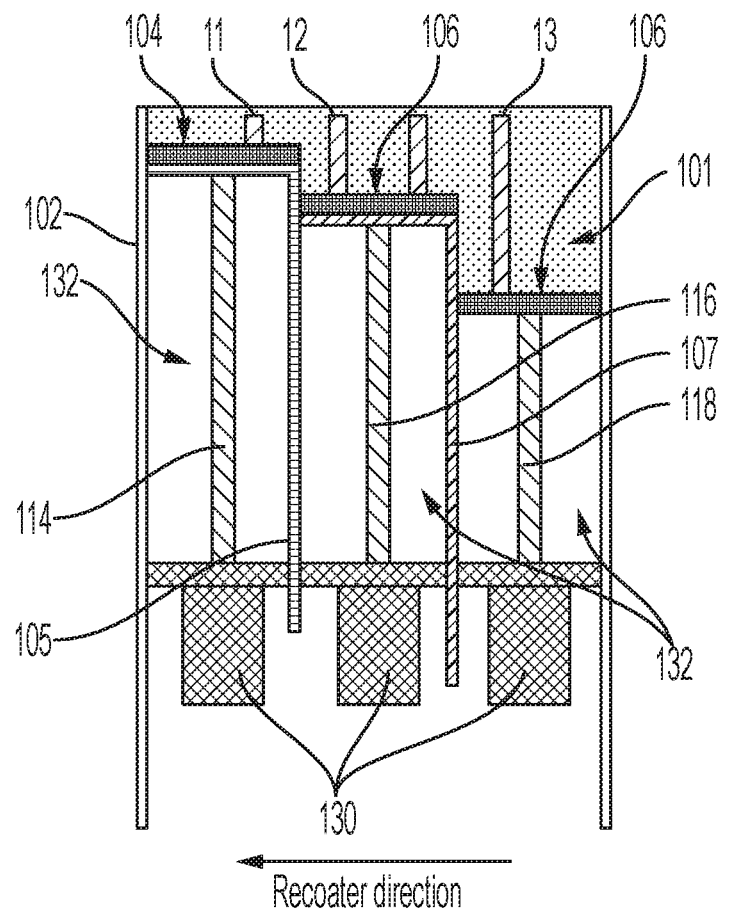
FIG. 1B is a side cross-sectional view of the configurable build volume system for a powder bed additive manufacturing process of FIG. 1A, according to an embodiment of the disclosure.
Figure 2A:
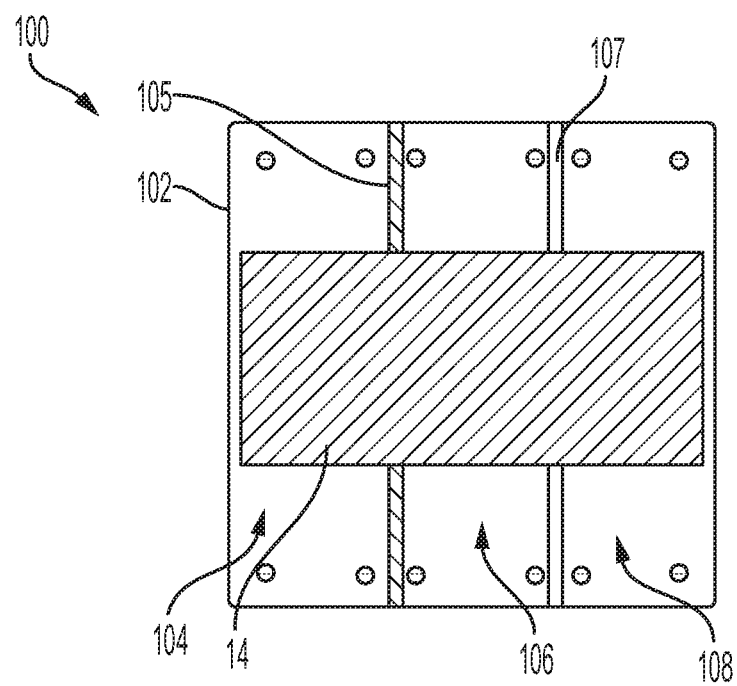
FIG. 2A is a top view of a configurable build volume system for a powder bed additive manufacturing process, according to an embodiment of the disclosure.
Figure 2B:
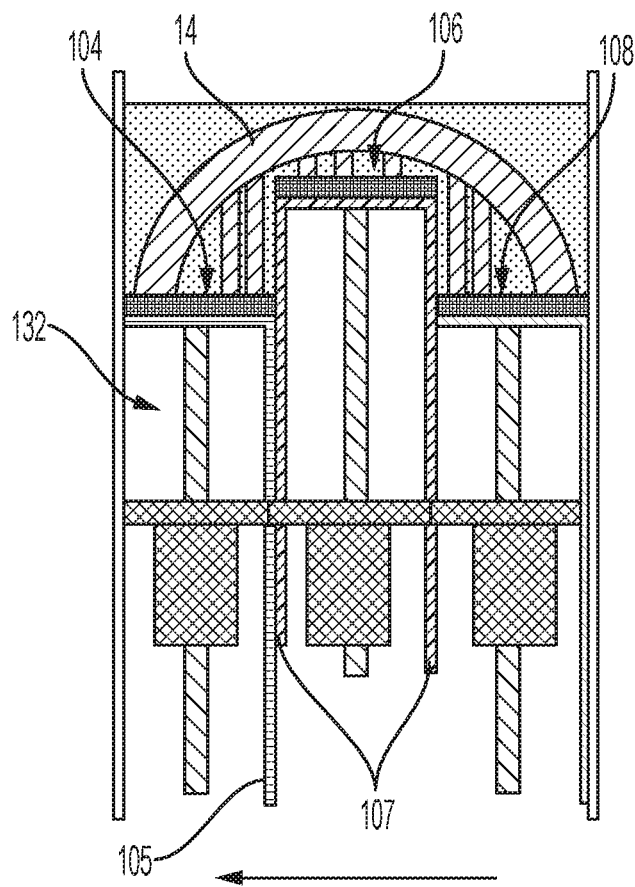
FIG. 2B is a side cross-sectional view of the configurable build volume system for a powder bed additive manufacturing process of FIG. 2A, according to an embodiment of the disclosure.
Figure 3A:
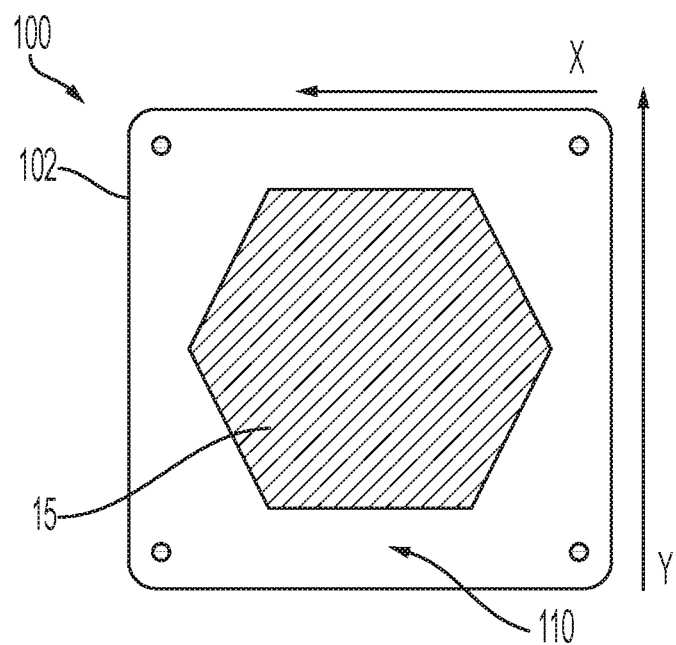
FIG. 3A is a top view of a configurable build volume system for a powder bed additive manufacturing process, according to an embodiment of the disclosure.

FIGS. 1A, 1B, 2A, 2B, 3A, and 3B illustrate various configurations of a configurable build volume system 100. As shown in each embodiment, the build volume system 100 is configurable to accommodate the manufacture of various components, including separate components of varying heights (FIGS. 1A and B), a complex component spanning the build volume with varying height support structures (FIGS. 2A and B), and a single component spanning the build volume (FIGS. 3A and B).

With reference to FIGS. 1A and 1B, one embodiment of the configurable build volume system 100 for powder bed fusion is illustrated. A chamber 101 is defined by a chamber wall 102 that extends in the X-, Y-, and Z-axis directions. The chamber 101 encloses multiple build platforms 104, 106, 108. Each platform includes a platform surface or plate upon which a component, such as the components 11, 12, 13 are built using powder bed fusion methods. The build platforms 104 and 106 are separated by a first movable wall 105. Similarly, the build platforms 106 and 108 are separated by a second movable wall 107. The movable wall 105 is movable with the build platform 104. The movable wall 107 is movable with the build platform 106. In various embodiments, as shown in FIG. 2B, the movable wall 107 extends along both sides of the build platform 106. The movable wall 105 and the movable wall 107 are configured to slide or translate adjacent to each other in the Z direction, as shown in FIG. 2B, such that an adjustment mechanism, for example, a rotating screw and motor system, is protected from powder incursion.

Each of the build platforms is coupled to an adjustment mechanism. The adjustment mechanism independently adjusts the position of each build platform along the Z axis of the chamber. The build platform 104 is supported by a first end of a rotatable post 114. Similarly, the build platform 106 is supported by a first end of a rotatable post 116 and the build platform 108 is supported by a first end of a rotatable post 118. Each of the rotatable posts 114, 116, 118 is coupled with a motor 130 at a second end of the rotatable post 114, 116, 118. In various embodiments, the motors 130 and the rotatable posts 114, 116, 118 are multiple, independent ball screw adjustment mechanisms 132 for independently adjusting the height of each the build platforms 104, 106, 108, as shown in FIG. 1B. For example, and without limitation, the build platforms 104, 106, 108 in FIG. 1B are illustrated at three different heights or positions along the Z axis to accommodate the manufacture of components of varying height with reduced waste of powder material.

As shown in FIGS. 2A and 2B, the height of each of the build platforms 104, 106, 108 is adjustable depending on the component to be produced, such as, for example, producing a component 14 that extends across the entire chamber 101, the component 14 including fused components of varying heights that provide support for the component 14 during manufacture and are later removed from the component 14. Similar to the configuration shown in FIGS. 1A and 1B, the build platforms 104, 106, 108 in FIG. 2B are illustrated at different heights to accommodate the manufacture of the component 14 including areas of varying height with reduced waste of powder material and reduced amount of supporting structure to be printed.

Figure 3B:
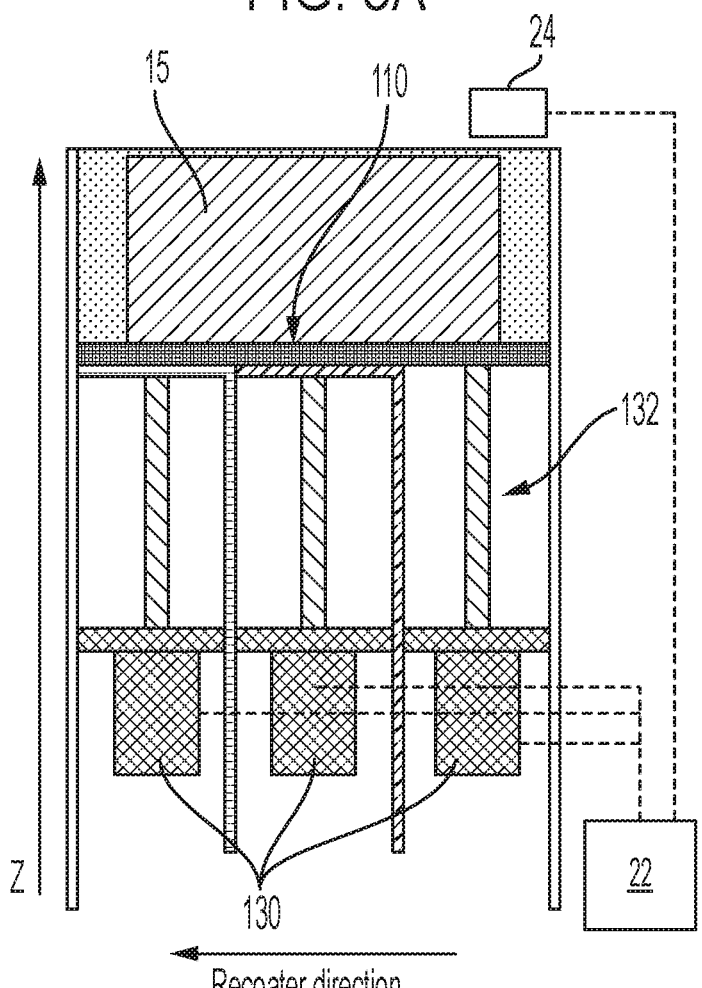
FIG. 3B is a side cross-sectional view of the configurable build volume system for a powder bed additive manufacturing process of FIG. 3A, according to an embodiment of the disclosure.

Additionally, in some embodiments, as shown in FIGS. 3A and 3B, a single build platform 110 is coupled to the multiple adjustment mechanisms 132. The single build platform 110 is used to manufacture a component, such as the component 15, that fills the chamber 101. In various embodiments, the single build platform 110 can be raised or lowered using some or all of the multiple adjustment mechanisms 132 working together.

In various embodiments, the adjustment mechanisms 132 are in electronic communication with at least one controller 22. The controller 22 is configured to adjust the height of one or more of the build platforms 104, 106, 108 via the adjustment mechanisms 132 based on the component(s) being manufactured. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In various embodiments, the configurable build volume system 100 also includes at least one sensor 24, such as a three-dimensional (3D) camera. The sensor 24 is in electronic communication with at least one controller, such as the controller 22. The sensor 24 captures data regarding the position of each of the build platforms 104, 106, 108 along the Z-axis. The position data is used by a controller, such as the controller 22, to accurately determine and adjust the position of each the build platforms 104, 106, 108. In various embodiments, the sensor 24 provides data regarding the position along the Z-axis of each build platform relative to one another and to the Z-axis. The data is transmitted to the controller 22 and used by the controller 22 to determine a desired position change of one or more of the build platforms. The controller 22 generates instructions in the form of one or more control signals. The one or more controls signals is transmitted to each of the adjustment mechanisms 132 to level or otherwise adjust the position of one or more of the build platforms.

Figure 4A:
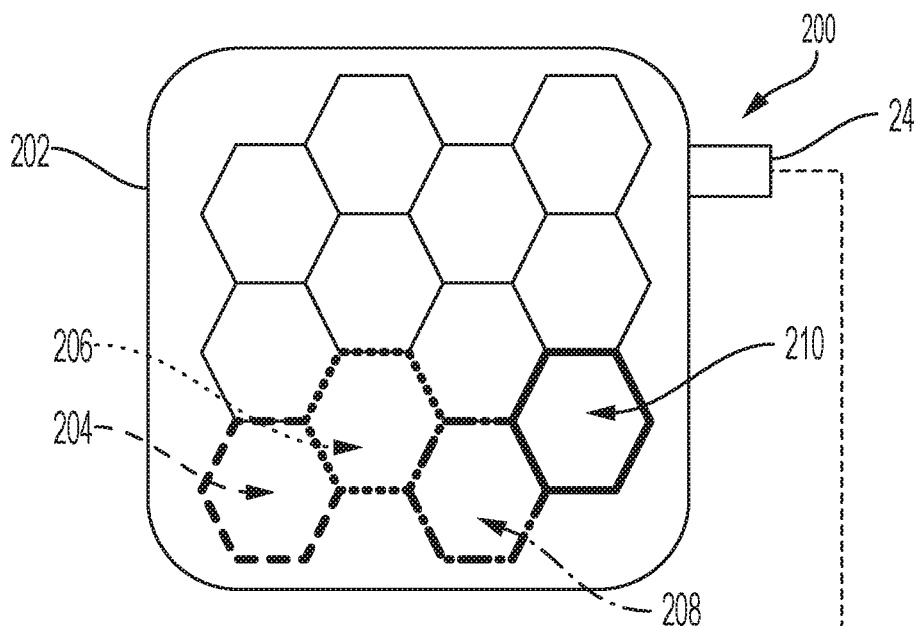
FIG. 4A is a top view of a configurable build volume system for a powder bed additive manufacturing process, according to an embodiment of the disclosure.
Figure 4B:
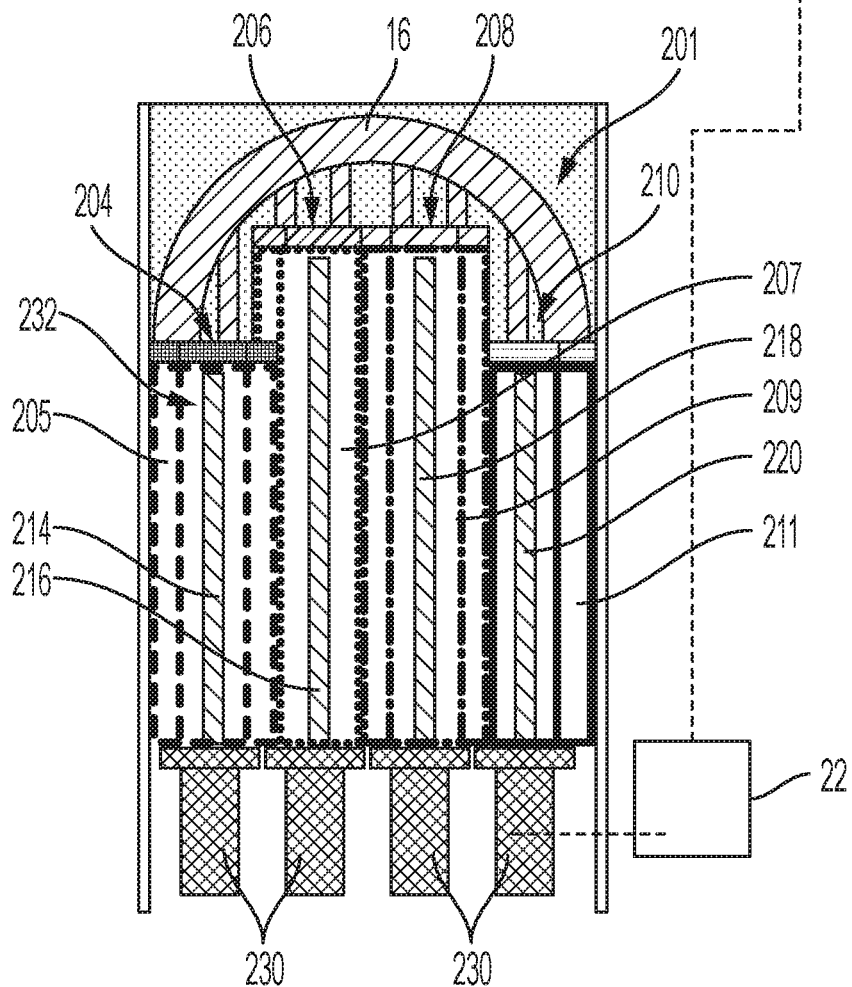
FIG. 4B is a side cross-sectional view of the configurable build volume system for a powder bed additive manufacturing process of FIG. 4A, according to an embodiment of the disclosure.

FIGS. 4A and 4B illustrate another embodiment of a configurable build volume system 200. A chamber 201 is defined by a chamber wall 202. The chamber 201 includes multiple build platforms 204, 206, 208, 210 with each platform including a platform surface or plate upon which a component, such as the component 16, is built using powder bed fusion methods. The edges of the build platform 204 include a first movable wall 205. Similarly, the edges of the build platform 206 include a second movable wall 207, the edges of the build platform 208 include a third movable wall 209, and the edges of the build platform 210 include a third movable wall 211. The movable wall 205 is movable with the build platform 204, and similarly, the movable wall 207 is movable with the build platform 206, the movable wall 209 is movable with the build platform 208, and the movable wall 211 is movable with the build platform 210. In various embodiments, as shown in FIG. 4B, the movable wall 205 extends downward from at least one side of the build platform 204, the movable wall 207 extends downward from at least one side of the build platform 206, the movable wall 209 extends downward from at least one side of the build platform 208, and the movable wall 211 extends downward from at least one side of the build platform 210. The movable walls are configured to slide or translate adjacent to each other, as shown in FIG. 4B, such that an adjustment mechanism, such as a rotating screw and motor system, is protected from powder incursion.

Each of the build platforms is coupled to an adjustment mechanism. The build platform 204 is supported by a rotatable post 214. Similarly, the build platform 206 is supported by a rotatable post 216, the build platform 208 is supported by a rotatable post 218, and the build platform 210 is supported by a rotatable post 220. Each of the rotatable posts 214, 216, 218, 220 is coupled with a motor 230. In various embodiments, the motors 230 and the rotatable posts 214, 216, 218, 220 are multiple, independent ball screw adjustment systems 232 for independently adjusting the position of each the build platforms 204, 206, 208, 210, along the Z-axis as shown in FIG. 4B. For example, and without limitation, the build platforms 204, 206, 208, 210 in FIG. 4B are illustrated at three different Z-axis positions to accommodate the manufacture of a complex component 16 spanning the chamber 201 and including support pieces of varying height with reduced waste of powder material and reduced amount of supporting structure to be printed, similar to the component 14 discussed herein.

In various embodiments, the adjustment systems 232 are in electronic communication with at least one controller 22. The controller 22 is configured to adjust and readjust the position of one or more of the build platforms 204, 206, 208, 210 via the adjustment systems 232 based on the component(s) being manufactured. The readjustment of the position of the one or more build platforms 204, 206, 208, 210 occurs throughout the manufacturing process, as discussed herein.

In various embodiments, the configurable build volume system 200 also includes at least one sensor 24, such as a three-dimensional (3D) camera. The sensor 24 is in electronic communication with at least one controller, such as the controller 22. The sensor 24 captures data regarding the Z-axis position of the build platforms. The position data is used by a controller, such as the controller 22, to accurately set and readjust the position of each of the build platforms.

While FIGS. 4A and 4B illustrate hexagonal build platforms 204, 206, 208, 210, the build platforms 204, 206, 208, 210 may be made into any shape. Furthermore, while the side view of FIG. 4B illustrates four build platforms coupled to four adjustment systems, in other embodiments, the other build platforms illustrated in FIG. 4A but not discussed in detail are also coupled to adjustment systems that allow each of the build platforms to be separately and independently controlled, such as by a controller 22.

Figure 5A:
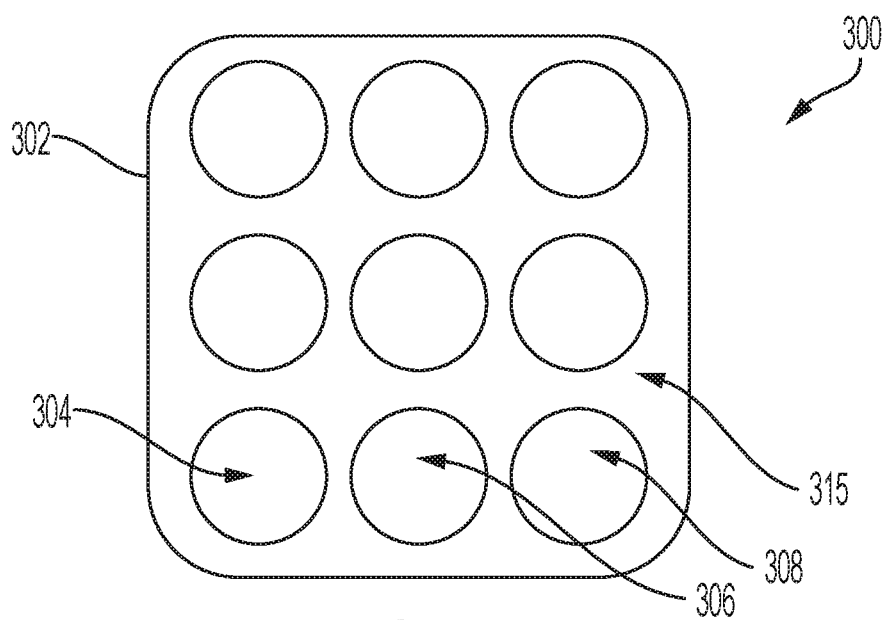
FIG. 5A is a top view of a configurable build volume system for a powder bed additive manufacturing process, according to an embodiment of the disclosure.
Figure 5B:
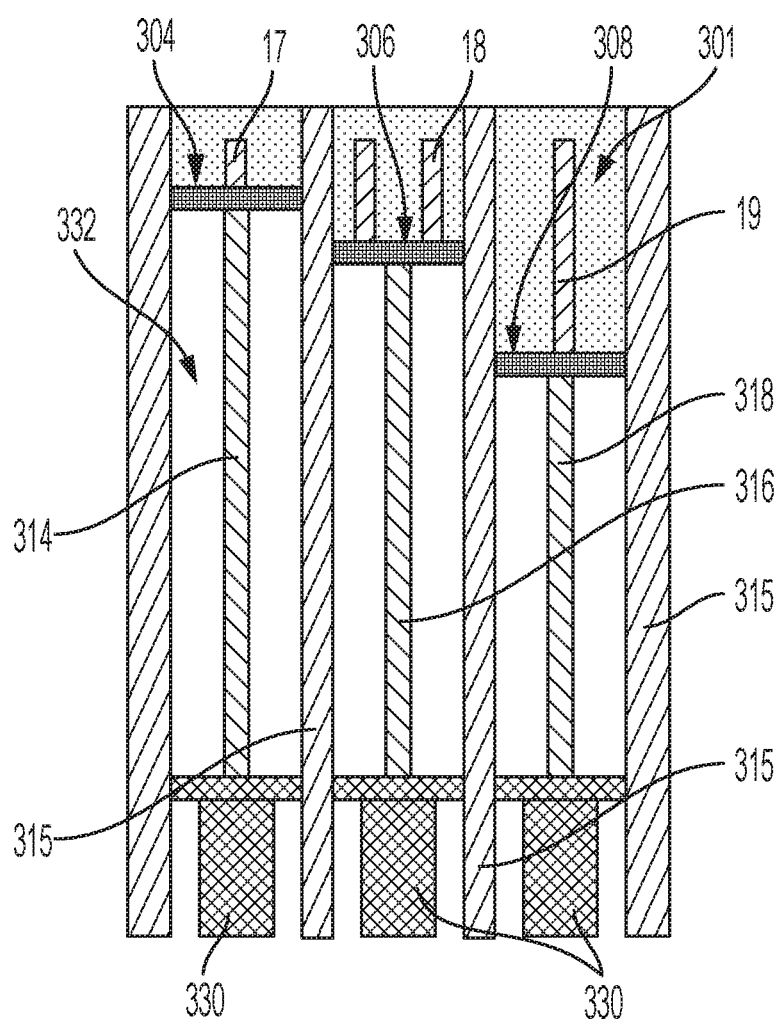
FIG. 5B is a side cross-sectional view of the configurable build volume system for a powder bed additive manufacturing process of FIG. 5A, according to an embodiment of the disclosure.

Another embodiment of a configurable build volume system 300 is illustrated in FIGS. 5A and 5B. The chamber wall 302 defines a chamber in which each of the build platforms 304, 306, 308 is separated from each other by a separation portion 315, which, in some embodiments is a wall. In other words, each of the build platforms 304, 306, 308, along with the separation portion 315, defines an isolated and contained build volume in which components, such as the components 17, 18, 19, are produced. In various embodiments, the temperature of each build volume is independently controlled and the temperature gradient in each build volume can be controlled throughout the manufacturing process.

Similar to the systems 100, 200 discussed herein, each of the build platforms 304, 306, 308 is coupled to an adjustment mechanism 332. The build platform 304 is supported by a rotatable post 314. Similarly, the build platform 306 is supported by a rotatable post 316, and the build platform 308 is supported by a rotatable post 318. Each of the rotatable posts 314, 316, 318 is coupled with a motor 330. In various embodiments, the motors 330 and the rotatable posts 314, 316, 318 are multiple, independent ball screw adjustment systems for independently adjusting the height of each the build platforms 304, 306, 308, as shown in FIG. 5B. The components 17, 18, and 19 are manufactured to different heights, with the component 17 having a first height, the component 18 having a second height greater than the first height, and the component 19 having a third height greater than the first and second heights.

While not shown but similar to the systems 100, 200 discussed herein, in various embodiments, the configurable build volume system 300 also includes at least one controller in communication with the adjustment system 332 coupled to each of the build platforms. Additionally, in various embodiments, the configurable build volume system 300 also includes at least one sensor (not shown) configured to capture data regarding the Z-axis position of each of the build platforms. In various embodiments, the at least one sensor is a 3D camera. The position data is used by a controller, such as the controller 22, to accurately set and adjust the position of each of the build platforms. While FIG. 5A illustrates nine (9) separate build platforms/volumes, the chamber 301 may include any number of separate build platforms/volumes.

Figure 6:
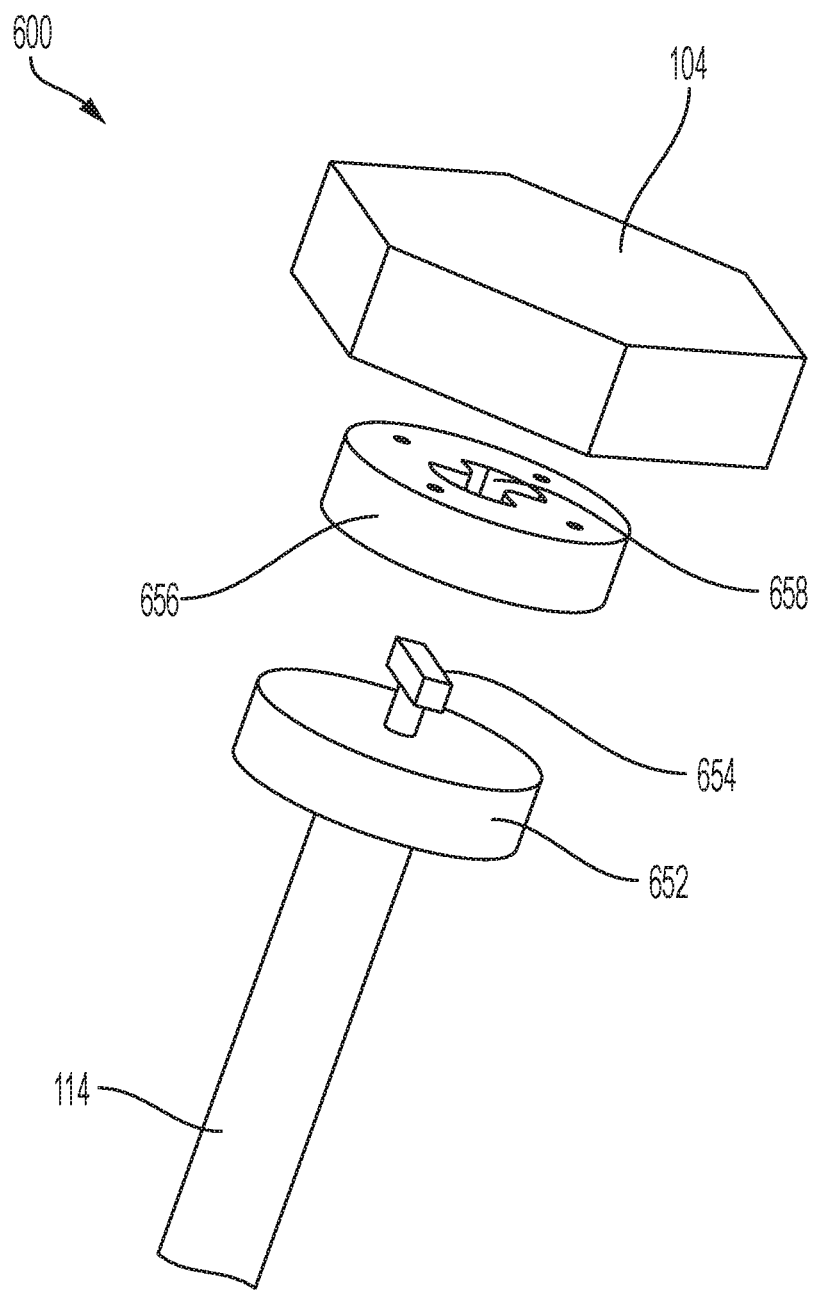
FIG. 6 is a top side perspective exploded view of a connection system for a configurable build volume system, according to an embodiment of the disclosure.

In various embodiments, the build platforms of any of the system 100, 200, 300 may be interchanged using a quick connect system 600, such as the one shown in FIG. 6. The rotatable post 114 includes a head portion 652 having an interlocking member 654 extending therefrom. In various embodiments, the interlocking member 654 is a T-shaped member extending from the head portion 652. The interlocking member 654 aligns and interfaces with an interlocking opening 658 of a connector member 656. A build platform, such as the build platform 104, is coupled to the connector member 656 using any type of mechanical connection means, such as one or more fasteners.

Figure 7:
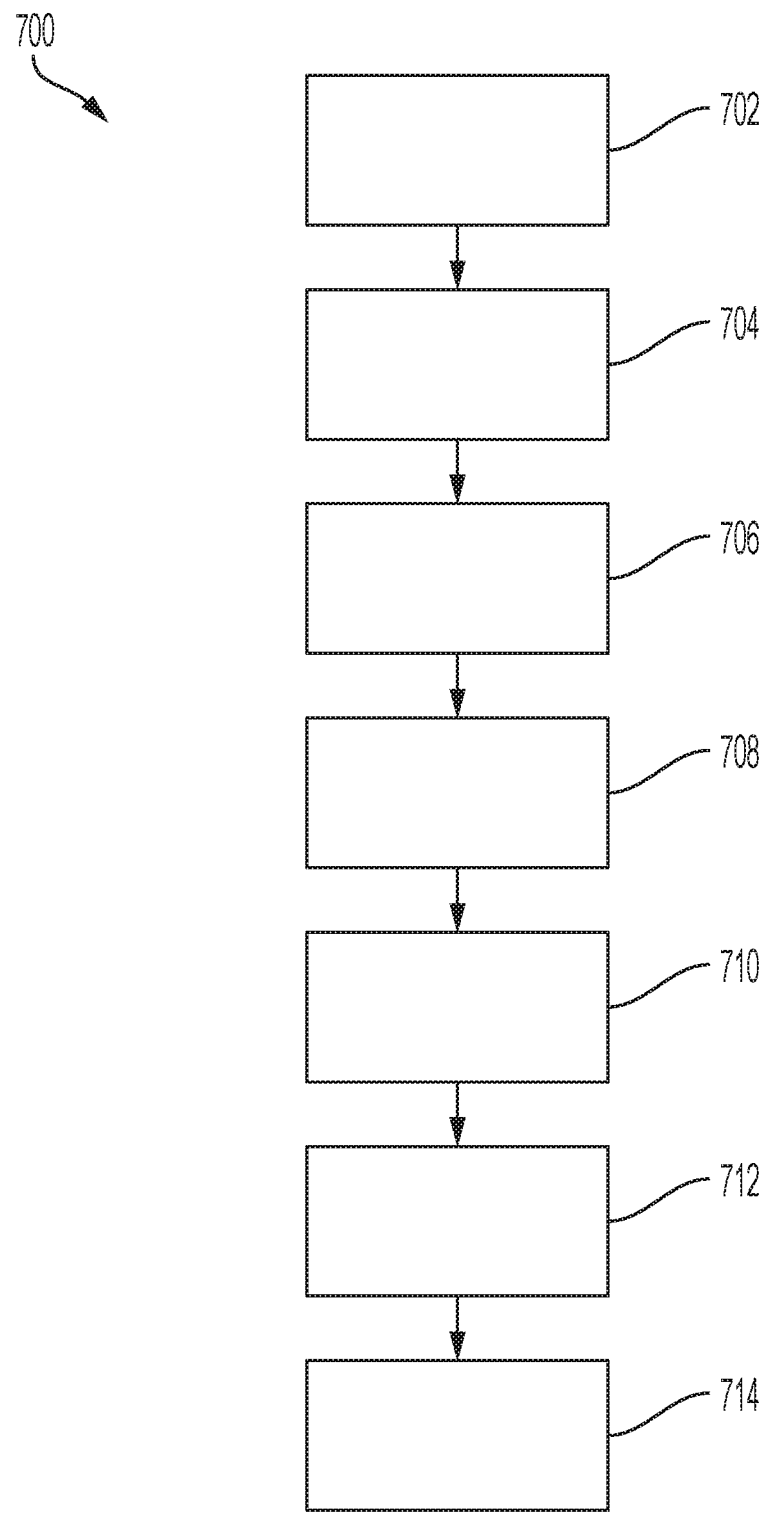
FIG. 7 is a flowchart of a method for manufacturing a component using a configurable build volume system, according to an embodiment of the disclosure.

FIG. 7 illustrates a method 700 to manufacture a component using a configurable build volume system. The method 700 can be utilized in connection with the configurable build volume systems 100, 200, 300 discussed herein for use with a powder bed fusion manufacturing process. The method 700 can be utilized in connection with the controller 22 as discussed herein, or by other systems associated with or separate from the configurable build volume systems, in accordance with exemplary embodiments. The order of operation of the method 700 is not limited to the sequential execution as illustrated in FIG. 7, but may be performed in one or more varying orders, or steps may be performed simultaneously, as applicable in accordance with the present disclosure.

Beginning at 702, a configurable build volume system is provided. The configurable build volume system includes one or more movable build platforms, such as the systems 100, 200, 300 discussed herein. The build platforms are each coupled to an adjustment system, such as the adjustment mechanism 132, that is in electronic communication with a controller, such as the controller 22. Additionally, the configurable build volume systems include at least one sensor, such as the sensor 24, that is in electronic communication with the controller and provides data as to the position of each of the movable build platforms within the chamber of the build volume system.

Next, at 704, the controller 22 is programmed with the desired dimensions of each component to be produced on each build platform. For example, a first build platform will be used to produce components with a first height dimension, a second build platform will be used to produce components with a second height dimension greater than the first height dimension, and a third build platform will be used to produce components with a third height dimension greater than the first and second height dimensions. In some embodiments of the method 700, a predetermined temperature is provided for each build platform, as discussed with respect to the configurable build volume system 300.

At 706, the controller 22 generates one or more control signals to incrementally lower the build platforms along the Z-axis. The control signals are transmitted by the controller and received by the adjustment system(s) and instruct the adjustment system(s) to raise or lower the position of the build platform(s). Next, at 708, the controller 22 generates a control signal to hold the first build platform at a predetermined position, based on the desired height/size of the component, that is, when the manufacturing process has produced a component with the first height on the first build platform. In various embodiments, this is a first configuration of the build platform(s).

At 710, the controller 22 then controls the powder dosing to the second and third build platforms, using any means known to those familiar with the powder bed fusion manufacturing process. The controller 22 monitors excess powder and instructs the manufacturing system to remove excess powder, if necessary.

Next, at 712, the controller 22 generates a control signal to hold the second build platform at a predetermined position, based on the desired height/size of the component, that is, when the manufacturing process has produced a component with the second height on the second build platform. In this step, the controller 22 may independently adjust the position of either or both of the first and third build platforms such that the build platforms are in a second configuration. At 714, the controller 22 continues to control the powder dosing to the third build platform, as discussed above, and monitors excess powder usage, generating instructions to remove excess powder, if necessary. The method 700 then ends.

In various embodiments, modifications are made to the method 700 to accommodate the production of components at different build temperatures, such as when the configurable build volume system 300 is used. The controller 22 generates control signals to independently control the temperature of each build platform/volume as well as generates control signals to independently control the position of each build platform during the manufacturing process.

Furthermore, in various embodiment, modifications are made to the method 700 to accommodate the manufacture of more or fewer components, such as repeating the steps 706 through 714 to manufacture additional components with additional layers of powder as the build platforms are held, lowered, or otherwise adjusted to a predetermined position (s) such that the build platforms are in additional configurations. The number and configuration of components manufactured during a manufacturing cycle using the method 700 is determined by the configuration of the configurable build volume system, as discussed herein, which may include independent build volumes for independent temperature control, physically separated build volumes for production of multiple independent components, and/or a unified build volume with adjustable height build platforms to manufacture a spanning component with support members of varying heights, as shown and discussed herein with reference to the systems 100, 200, 300.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A configurable build volume system for a powder bed fusion manufacturing process, the system comprising:
    a chamber wall defining a chamber, the chamber wall extending in the X-, Y-, and Z-axis directions;
    a first build platform including a first platform surface, the first build platform enclosed within the chamber;
    a second build platform including a second platform surface, the second build platform enclosed within the chamber;
    a first adjustment mechanism comprising a first rotatable post coupled to the first build platform at a first end and coupled to a first motor at a second end opposite the first end, the first adjustment mechanism enclosed within the chamber;
    a second adjustment mechanism comprising a second rotatable post coupled to the second build platform at a first end and coupled to a second motor at a second end opposite the first end, the second adjustment mechanism enclosed within the chamber;
    a sensor mounted within the chamber and configured to capture position data regarding a first position along the Z-axis of the first build platform and a second position along the Z-axis of the second build platform, wherein the sensor is a three-dimensional (3D) camera; and
    a controller in electronic communication with the first and second adjustment mechanisms and the sensor;
    wherein the controller receives the position data from the sensor, generates a first control signal to adjust a Z-axis position of the first build platform to a first position, generates a second control signal to adjust a Z-axis position of the second build platform to a second position within the chamber, transmits the first control signal to the first adjustment mechanism, and transmits the second control signal to the second adjustment mechanism such that the first and second build platforms are independently controlled and adjusted by the controller.

2. The configurable build volume system of claim 1, wherein the first build platform includes a first wall separating the first adjustment mechanism from the second adjustment mechanism, and the first wall translates within the chamber with the first build platform.

3. The configurable build volume system of claim 1, wherein the second build platform includes a second wall separating the first adjustment mechanism from the second adjustment mechanism, and the second wall translates within the chamber with the second build platform.

4. The configurable build volume system of claim 1 further comprising a separating portion separating the first build platform from the second build platform such that each of the first and second build platforms are physically separated and individually temperature controlled.

5. The configurable build volume system of claim 1 further comprising a third build platform including a third platform surface and a third adjustment mechanism comprising a third rotatable post coupled to the third build platform at a first end and coupled to a third motor at a second end opposite the first end, the first, second, and third build platforms extending across the chamber in the Y-direction and extending along the X-axis of the chamber such that the second build platform is adjacent to each of the first and third build platforms.

6. The configurable build volume system of claim 5, wherein the controller generates a third control signal to adjust a Z-axis position of the third build platform to a third position and transmits the third control signal to the third adjustment mechanism.

7. The configurable build volume system of claim 6, wherein each of the first, second, and third build platforms is individually adjustable such that the first build platform is adjustable to a first position along the Z-axis, the second build platform is adjustable to a second position along the Z-axis different from the first position, and the third build platform is adjustable to a third position along the Z-axis different from the first and second positions.

8. The configurable build volume system of claim 6, wherein each of the first, second, and third build platforms is individually adjustable such that the first build platform is adjustable to a first position along the Z-axis, the second build platform is adjustable to a second position along the Z-axis, and the third build platform is adjustable to a third position along the Z-axis.

9. The configurable build volume system of claim 1, wherein each of the first and second platforms is hexagonal.

10. A configurable build volume system for a powder bed fusion manufacturing process, the system comprising:
a chamber wall defining a chamber, the chamber wall extending in the X-, Y-, and Z-axis directions;
a plurality of build platforms enclosed within the chamber;
a plurality of adjustment mechanisms coupled to the plurality of build platforms such that each build platform is coupled to a separate adjustment mechanism, each adjustment mechanism of the plurality of adjustment mechanisms comprising a rotatable post coupled to the build platform at a first end and coupled to a motor at a second end opposite the first end;
a sensor mounted within the chamber and configured to capture data regarding a Z-axis position of each of the plurality of build platforms, wherein the sensor is a 3D camera; and
a controller in electronic communication with the plurality of adjustment mechanisms and the sensor;
wherein the controller receives the Z-axis position data and generates a plurality of control signals to adjust a Z-axis position of each of the plurality of build platforms and each of the plurality of build platforms is actively and independently controlled by the controller.

11. The configurable build volume system of claim 10 further comprising a separating portion separating each of the plurality of build platforms from each other such that each of the plurality of build platforms is a physically separated volume and is individually temperature controlled.

12. The configurable build volume system of claim 10, wherein a Z-axis position of each of the plurality of build platforms is individually adjustable.

13. The configurable build volume system of claim 10, wherein each of the plurality of build volumes is hexagonal.

14. The configurable build volume system of claim 10, wherein each of the plurality of build platforms includes a wall extending in the Z-axis direction within the chamber such that when adjacent build platforms are positioned at different positions along the Z-axis, the adjustment mechanisms of the adjacent build platforms are separated by the wall.

15. A method for powder bed fusion manufacture of a component with the configurable build volume system of claim 1, the method comprising:
providing a configurable build volume system including a chamber wall defining a chamber, the chamber wall extending in the X-, Y-, and Z-axis directions, a plurality of build platforms enclosed within the chamber, and a plurality of adjustment mechanisms coupled to the plurality of build platforms such that each build platform is coupled to a separate adjustment mechanism, each adjustment mechanism of the plurality of adjustment mechanisms comprising a rotatable post coupled to the build platform at a first end and coupled to a motor at a second end opposite the first end;
providing a controller in electronic communication with the plurality of adjustment mechanisms;
determining, by the controller, a first height of each of the plurality of build platforms such that the plurality of build platforms form a first configuration;
generating, by the controller, a plurality of control signals to adjust a Z-axis position of each of the plurality of build platforms such that the plurality of build platforms form a second configuration different from the first configuration;
applying a powder to the plurality of build platforms; and
monitoring, by the controller, a powder usage of a powder material.

16. The method for powder bed fusion manufacture of claim 15, wherein each of the plurality of build platforms includes a wall extending in the Z-axis direction within the chamber such that when adjacent build platforms are positioned at different positions along the Z-axis, the adjustment mechanisms of the adjacent build platforms are separated by the wall.

17. The method for powder bed fusion manufacture of claim 15, wherein each of the plurality of build platforms is separated from each other by a separating portion such that each of the plurality of build platforms is a physically separated volume and generating, by the controller, a plurality of temperature control signals to adjust a temperature of each of the plurality of build platforms.

18. The method for powder bed fusion manufacture of claim 15, wherein providing the configurable build volume further comprises providing the 3D camera sensor mounted within the chamber and in electronic communication with the controller, the 3D camera sensor configured to capture data regarding a Z-axis position of each of the plurality of build platforms, and the method further comprises:
generating, by the 3D camera sensor, first Z-axis position data of the plurality of build platforms;
receiving, by the controller, the first Z-axis position data;
determining, by the controller, a first configuration of the plurality of build platforms from the first Z-axis position data;

controlling, by the controller, the plurality of adjustment mechanisms to independently move each of the plurality of build platforms to the first configuration;
generating, by the 3D camera sensor, second Z-axis position data of the plurality of build platforms;
receiving, by the controller, the second Z-axis position data;
determining, by the controller, a second configuration of the plurality of build platforms from the second Z-axis position data; and
controlling, by the controller, the plurality of adjustment mechanisms to independently move each of the plurality of build platforms to the second configuration.

* * * * *